United States Patent [19]

Germain et al.

[11] Patent Number: 4,775,224
[45] Date of Patent: Oct. 4, 1988

[54] LIQUID CRYSTAL OPTICAL DEVICES ENABLING HIGH FREQUENCY AC EXCITATION TO BE EMPLOYED

[75] Inventors: Claude Germain, Orsay; Marguerite Boix, Vaugrigneuse; Georges E. A. Durand, Orsay; Philippe Martinot-Lagarde, Marcoussis; Mohamed Monkade, Orsay, all of France

[73] Assignee: Centre National de la Recherche Scientifique (CNRS), Paris, France

[21] Appl. No.: 49,403

[22] Filed: May 14, 1987

[30] Foreign Application Priority Data

May 14, 1986 [FR] France ................... 8606916

[51] Int. Cl.⁴ ............................................. G02F 1/13
[52] U.S. Cl. ................................. 350/336; 350/332; 350/346; 350/347 E
[58] Field of Search .................. 350/336, 347 E, 332, 350/346

[56] References Cited

U.S. PATENT DOCUMENTS

| | | | |
|---|---|---|---|
| 3,675,988 | 7/1972 | Soref | 350/160 |
| 3,694,053 | 9/1972 | Kahn | 350/347 E |
| 3,934,199 | 1/1976 | Channin | 350/347 E X |
| 4,023,890 | 5/1977 | Shirasu et al. | 350/336 |
| 4,277,517 | 7/1981 | Smith, Jr. | 427/96 |
| 4,395,467 | 7/1983 | Vossen, Jr. | 428/697 |
| 4,432,611 | 2/1984 | Wei | 350/336 X |

FOREIGN PATENT DOCUMENTS

| | | |
|---|---|---|
| 2429092 | 1/1975 | Fed. Rep. of Germany . |
| 2526177 | 9/1984 | France . |
| 2572210 | 2/1987 | France . |
| 2587506 | 3/1987 | France . |
| 2112540 | 7/1983 | United Kingdom . |

OTHER PUBLICATIONS

"Deformation of a Pretilted Nematic Liquid Crystal Layer in an Electric Field", by Fahrenschon, et al., Applied Physics, vol. 11, No. 1, Sep. 1976, pp. 67-74.
New multicolor liquid crystal display, by Matsumoto et al., Journal of Applied Physics, pp. 3842-3845.
"Surface-Stabilized Ferroelectric Liquid Crystal Electro-Optics: New Multistate Structures and Devices", by N. Clark et al., Ferroelectrics, (1984), vol. 59, pp. 25-67.

Primary Examiner—Stanley D. Miller
Assistant Examiner—Richard Gallivan
Attorney, Agent, or Firm—Fleit, Jacobson, Cohn & Price

[57] ABSTRACT

A method applicable to a liquid crystal cell comprising two parallel transparent plates (11, 12) coated on their facing inert faces with electrode-forming conductive coatings (14,15), and with a shim (13) interposed between the plates, the space in said cells between said plates containing a substance (17) including molecules which are endowed with nematic properties, wherein: controlled variations in surface impedance are defined on at least one of the electrode coatings in selected zones (16) thereof; and a variable frequency excitation electrical voltage is applied between the electrodes (14, 15) provided on respective ones of said plates (11, 12), and voltage being selected to be suitable for producing alternately an electric field extending normally to the electrodes and an electric field which slopes relative to the normal to said electrodes at said zones (16) having a controlled impedance variation.

17 Claims, 8 Drawing Sheets

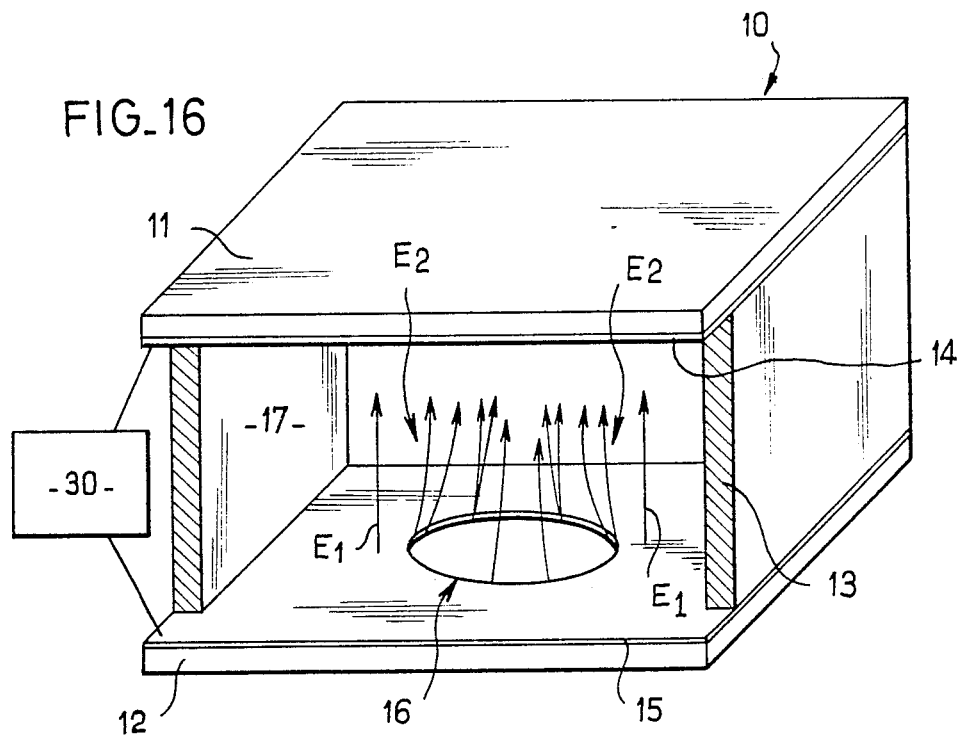
FIG_16
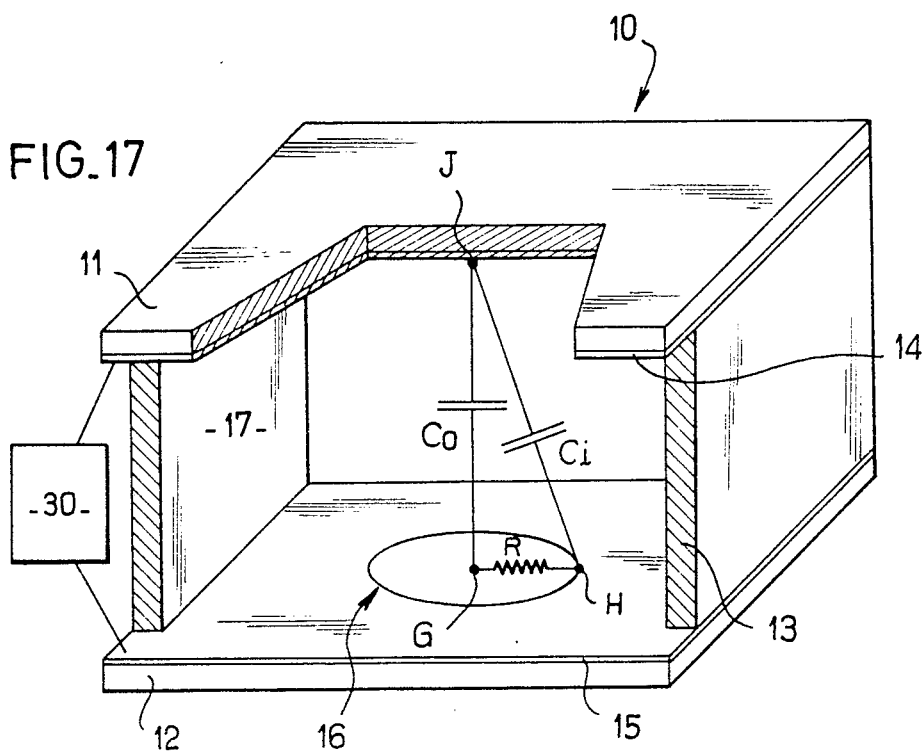
FIG_17

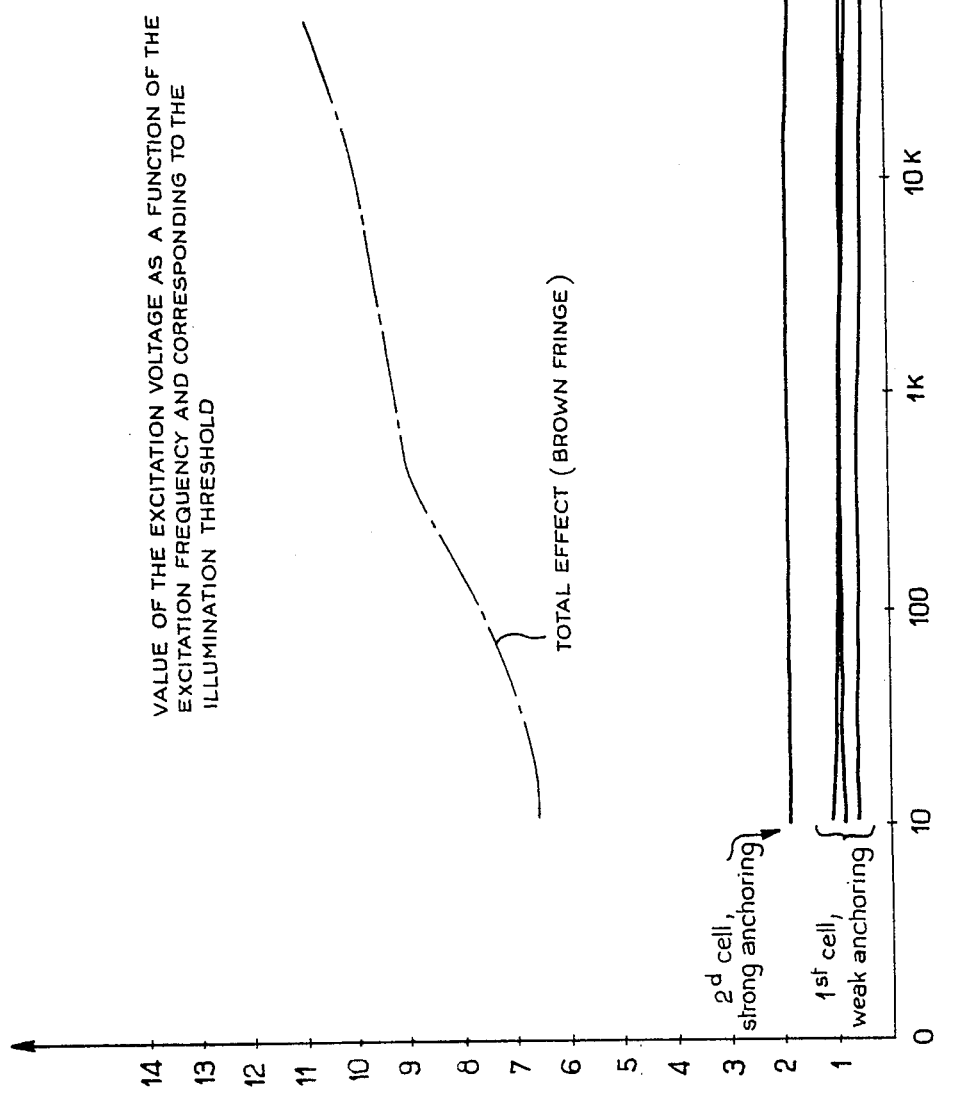

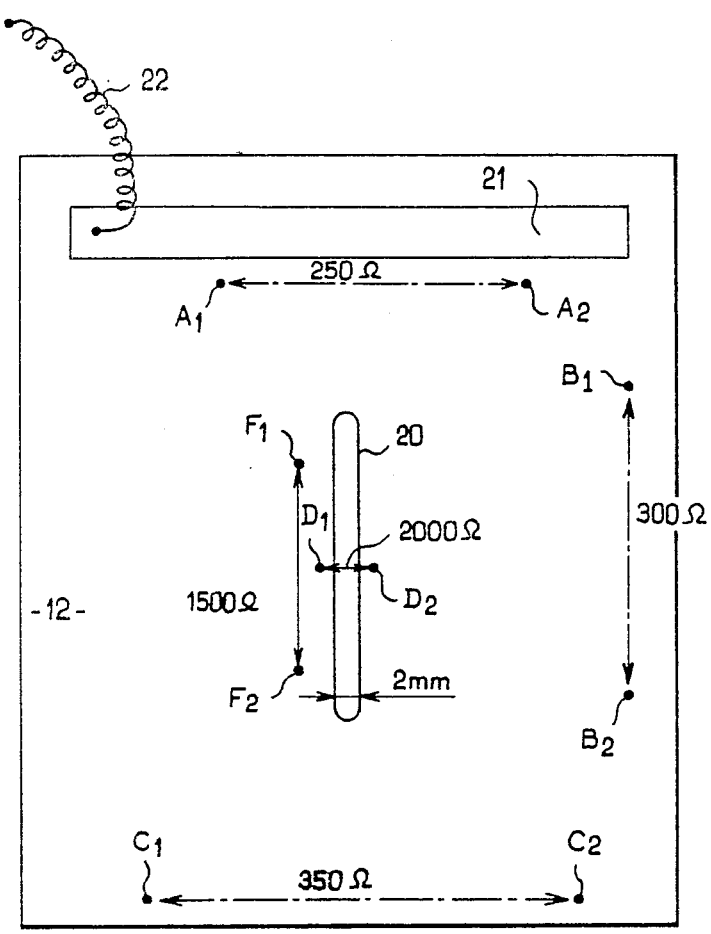
FIG_19
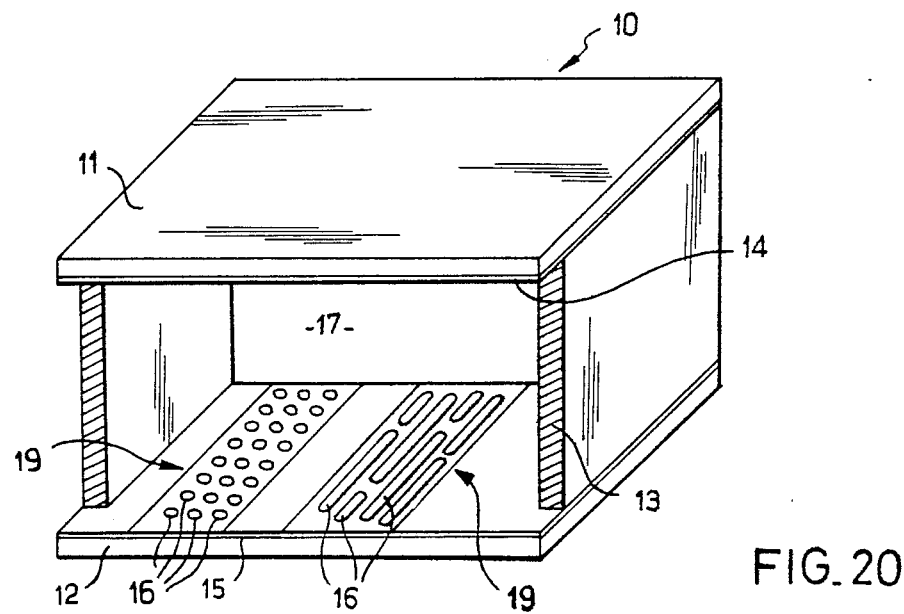
FIG_20

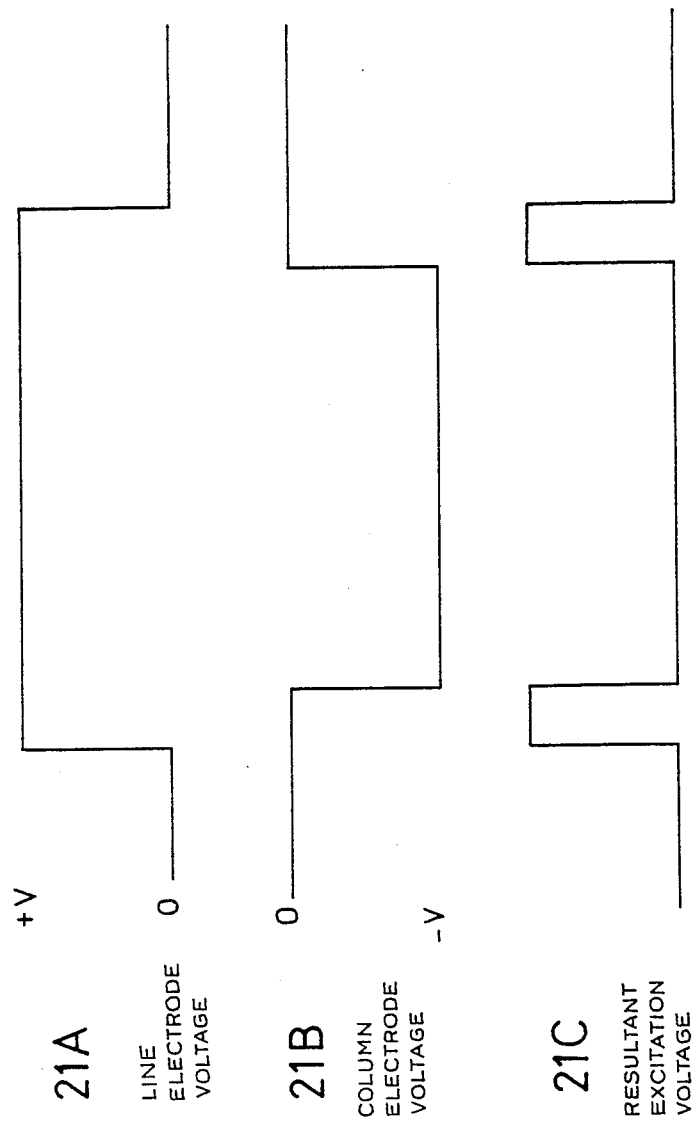

LIQUID CRYSTAL OPTICAL DEVICES ENABLING HIGH FREQUENCY AC EXCITATION TO BE EMPLOYED

The present invention relates to optical devices using liquid crystals.

The present invention was made in the Physics of Solids Laboratory in the University of Paris Sud, which laboratory is associated with the French National Center for Scientific Research (CNRS N 04 0002).

BACKGROUND OF THE INVENTION

Much research work has been performed on liquid crystals at least over the last dozen or so years.

This work has given rise to numerous publications.

Particular mention may be made of the following documents:

(1) APPLIED PHYSICS, vol. 11, No. 1, September 1976, Springer-Verlag, K. Fahrenshon et al: "Deformation of a Pretilted Nematic Liquid Crystal Layer in an Electric Field", pages 67–74; and (2) JOURNAL OF APPLIED PHYSICS, vol. 47, No. 9 September 1976, American Institute of Physics, S. Matsumoto et al: "Field-induced deformation of hybrid - aligned nematic liquid crystals: New-multicolor liquid crystal display", pages 3842–3845, which deals with an electrically-controlled birefringence effect in nematic liquid crystals taking place, in the volume of a cell containing a liquid crystal material, by coupling between an electric field applied to the cell and the dielectric anisotropy of the liquid crystal.

In addition, some of the results of research work done at the University of Paris Sud Physics of Solids Laboratory are described in French patent application No. 82 07309 filed Apr. 28, 1982 and published under the number 2,526,177, French Pat. application No. 84 16192 filed Oct. 23, 1984, published under the number 2,572,210, and French Pat. application No. 85 09224 filed June 18, 1985, published under the number 2,587,506.

One of the major drawbacks in most electro-optical devices described in the past stems from the fact that their response time to an electric excitation is considerably more than one millisecond. There has been a recent proposal for a system enabling polarized light to be switched rapidly (in the microsecond range) by liquid crystals. This device uses ferroelectricity in a volume of a chiral smectic material with weak surface anchoring, and is described in Ferroelectrics 59 25 (1984) by N. Clark and S. Lagerwall.

However, although this device enables a relatively short response time to be obtained, it suffers from various drawbacks including: difficulty in working with multiplexing; the polar character of the anchoring; the necessity of accurately controlling the anchoring force; and the power consumption of the cells while being maintained by an AC electric field.

Taking account of the limits of prior devices, the inventors seek to provide novel means enabling high frequency electric excitation (up to several MHz) to be used on liquid crystal electro-optical devices.

SUMMARY OF THE INVENTION

After much theoretical study and numerous experiments, the inventors propose solving the above problem by providing an electro-optical method applicable to a liquid crystal cell comprising two parallel transparent plates coated on their facing inner faces with electrode-forming conductive coatings, and with a shim interposed between the plates, the space in said cells between said plates containing a substance including molecules which are endowed with nematic properties, wherein:

controlled variations in surface impedance are defined on at least one of the electrode coatings in selected zones thereof; and a variable frequency excitation electrical voltage is applied between the electrodes provided on respective ones of said plates, said frequency being selected to be suitable for producing alternately an electric field extending normally to the electrodes and an electric field which slopes relative to the normal to said electrodes at said zones having a controlled impedance variation.

As explained below, electro-optical devices obtained in this way make it possible to generate an electric field between the plates which field diverges and slopes at the zones having a coating with controlled impedance variation, and as a result make it possible to obtain curvature and slope in the nematic director of the molecules endowed with the nematic property and placed between the plates, in a manner suitable for producing a birefringence effect.

Preferably, the method in accordance with the present invention includes a stage of applying an alternating electrical excitation voltage between the two electrodes provided on respective ones of the plates at a frequency which alternates between being greater than and less than a critical instability frequency at which the essentially capacitive dielectric impedance ($1/C_i$) between a second point and a third point is equal to the sum of the dielectric impedance ($1/C_O$) between the third point and a first point and the impedance (R) between the second point and the first point, where said first point is located on a zone of controlled impedance variation of a coating, said second point is located on the same coatings and passing through said first point is located on the other coating and is situated on a normal to both coatings and passing through said first point.

BRIEF DESCRIPTION OF THE DRAWINGS

Implementations of the invention are described by way of example with reference to the accompanying drawings, in which:

FIG. 16 is a perspective diagram showing an electro-optical cell in accordance with the present invention;

FIG. 17 is a diagram showing the method implemented by the invention in said cell in order to obtain a birefringence effect;

FIG. 18 is a graph showing various curves illustrating the value of the excitation voltage as a function of the excitation frequency and corresponding to the illumination threshold for various different embodiments of a cell in accordance with the above-mentioned first example, shown in the photographs of FIGS. 1, 2, and 3;

FIG. 19 is a diagram of an electrode coating obtained after implementing the method of preparation in accordance with the present invention;

FIG. 20 shows an example of an electro-optical cell in accordance with the present invention; and FIG. 21 is a diagram showing one manner in which a device in accordance with the present invention may be excited.

MORE DETAILED DESCRIPTION

Figure 2:
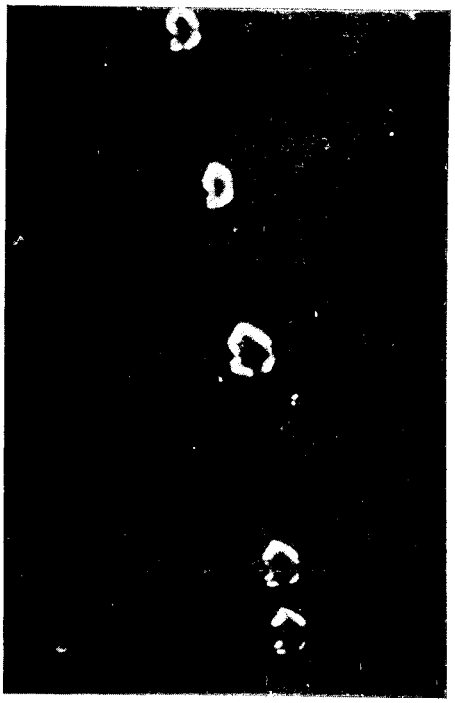
FIGS. 1, 2, and 3 are three magnified photographs of a first example of a cell implementing the present invention and corresponding to an excitation frequency greater than the critical frequency and to different amplitudes of electrical excitation.

The description begins with an explanation of the method for preparing a liquid crystal electro-optical device in accordance with the present invention.

As mentioned above, the first stage of this method consists in preparing two parallel transparent plates each coated on one of its faces with an electrode-forming conductive coating defining controlled variations in surface impedance for at least one of the electrode coatings over selected zones thereof.

Thereafter, the two plates prepared in this way are put close together in a substantially parallel disposition after a shim has been interposed between the plates and the space delimited by these two plates and the shim is filled with a substance including molecules endowed with nematic properties.

Preferably, the controlled variations in surface impedance of at least one of the electrode coatings are obtained by altering the intrinsic impedance of the electrode-forming conductive coating. Various different techniques can be used for obtaining this alteration in intrinsic impedance.

In a first embodiment a chemical reaction is used. The stage consisting in defining the controlled variations in surface impedance of at least one of the electrode coatings is then performed as follows: (1) a uniform layer of homogeneous conductor coating is applied to one of the plates; and then (2) the surface impedance of the coating is modified in selected zones thereof by a chemical reaction.

More precisely, in the presently preferred embodiment of this first variant, the stage consisting in defining the controlled variations in surface impedance of at least one of the electrode coatings is performed as follows: (1) by depositing a uniform layer of an electrically conductive coating of indium and tin oxides (ITO) on one of the plates, and then (2) obtaining at least partial reduction of the indium and tin oxides in the selected zones of the coating by chemical reaction. Indium tin oxide which is theoretically a semiconductor becomes less conductive and even insulative after chemical reduction.

Another way of altering the intrinsic impedance of the electrode-forming conductive coating is to reduce the thickness thereof either totally or partially by mechanical means. In this case, the stage consisting in defining the controlled variations in surface impedance of at least one of the electrode coatings is performed as follows: (1) a uniform layer of homogeneous conductive coating is deposited on one of the plates, and then (2) selected zones of this coating are reduced in thickness by mechanical means.

Another way of obtaining controlled variations in surface impedance of at least one of the electrode coatings consists in depositing a covering layer of a material having a different electrical conductivity to that of the coating over said selected zones of the electrically conductive coating.

The above-mentioned controlled variations in surface impedance of at least one of the electrode coatings may correspond either to a smooth variation in impedance from the peripheries of the selected zones towards the centers thereof, or else to a step variation in impedance on crossing the boundary of the selected zones. The widths of said zones are preferably of the same order of magnitude as the thickness of the cell.

The person skilled in the art will readily understand that when a smooth variation is to be obtained in the impedance from the peripheries of the selected zones towards the centers thereof, it is preferable to modify the surface impedance of the coating by chemical reaction. However, when a step variation in impedance is desired on crossing the boundaries of the selected zones, it is preferable to use mechanical means for reducing the thickness of the coating or else to cover the coating or to replace it in the selected zones.

FIG. 16 is a diagram of a liquid crystal electro-optical cell obtained in this manner.

In FIG. 16, it can be seen that a cell 10 comprises two parallel transparent plates 11 and 12 which are preferably made of glass. A shim 13 is interposed between the plates 11 and 12, and together therewith the shim 13 defines a sealed internal chamber containing a substance 17 which includes molecules endowed with nematic properties. The facing inside surfaces of the plates 11 and 12 are provided with respective transparent electrically conductive electrode-forming coatings 14 and 15.

When these electrodes 14 and 15 are connected to the terminals of an electrical power supply represented diagrammatically by reference 30, they apply an electric field to the substance 17, said field being of controlled value and being oriented generally normally to the plates 11 and 12.

FIG. 16 also shows diagrammatically a zone 16 in which a controlled variation in the surface impedance of the coating 15 has been obtained, e.g. mechanically.

Around the periphery of the zone 16 the electrode 15 is of substantially uniform conductivity and therefore has substantially uniform charge density. Consequently, the application of an excitation electric voltage between the electrodes 14 and 15 generates an electric field around the periphery of the zone 16 which is substantially uniform and which is directed generally normally to the electrodes 14 and 15.

In FIG. 16, this electric field directed normally to the electrodes is illustrated diagrammatically by arrows referenced $E_1$.

However, when the power supply means 30 provide an alternating excitation voltage at a frequency greater than a critical instability frequency explained below, an electric field is obtained above the zone 16 (which corresponds to a zone of controlled impedance variation) such that the electric field diverges and slopes as it goes away from the boundary of the zone 16, as illustrated diagrammatically in FIG. 16 by arrows referenced $E_2$. As a result, when a substance 17 is used which includes molecules endowed with nematic properties and having high dielectric anisotropy, the nematic director above the above-mentioned zone 16 inside the cell 10 is caused to slope. This is because molecules endowed with nematic properties and having high dielectric anisotropy follow the orientation of the sloping field $E_2$.

This may be obtained either by using nematic liquid crystals having positive dielectric anisotropy, such as cyanobiphenyl compounds, or else by using nematic crystals having negative dielectric anisotropy.

When using positive dielectric anisotropy, the dielectric constant in the axial direction of the molecules is greater than the dielectric constant perpendicular to said axis so the molecules become oriented parallel to the electric field.

Conversely, when using negative dielectric anisotropy, the dielectric constant in the axial direction of the molecules is less than the dielectric constant perpendicular to said axis, and the molecules become oriented perpendicularly to the electric field.

The sloping disposition of the liquid crystal molecules thus produces a visible birefringence effect when the cell is observed in polarized light between two crossed polarizers, for example.

Two experimental examples are now described, one relating to a liquid crystal electro-optical device in accordance with the present invention for which one of the electrode-forming coatings has been treated mechanically in the selected zone in order to define step changes in impedance, and the other of which concerns a liquid crystal electro-optical device in accordance with the present invention in which one of the coatings has been subjected to chemical treatment in order to determine a surface impedance gradient in the selected zones.

EXAMPLE 1

A first series of experiments was performed on a series of cells comprising a first plate 12 covered with a deposit of gold 15 evaporated in vacuo at a sloping incidence (60°) and electrically conductive, said coating having a thickness of about 700 Å, with holes 16 having an average diameter of about 80$\mu$ being made through the gold deposit by means of a needle, and a second plate 11 having a coating 14 of indium and tin oxide treated with homotropic silane. The cells are filled with a 5CB type liquid crystal. They are observed between crossed polarizers.

More precisely, experiments were performed on several cells of a first type corresponding to weak anchoring of the liquid crystal and made using shims 13 having respective thicknesses of 5$\mu$, 20$\mu$ and 65$\mu$.

The weak anchoring of the liquid crystal is shown by the fact that the holes 16 made in the gold deposit 15 did not become homotropic immediately but only after the cells had been filled for at least twenty-four hours.

Other experiments were performed on a cell with strong anchoring. Strong anchoring is shown by the fact that the holes 16 made through the gold deposit became homotropic immediately after the cell was filled.

The experiments with strong anchoring type cells were performed solely with a shim 13 having a thickness of 6$\mu$.

Measurements were initially made of the applied voltage between the electrodes of the cell in order to obtain the illumination threshold of the edges of the holes 16 as a function of various excitation frequencies extending overall from 10 Hz to 1 MHz. The results of these measurements are shown in solid lines in FIG. 18.

It can be seen from this figure that in order to illuminate the edges of the holes 16, the excitation voltage is practically constant for a given sample regardless of frequency up to 700 KHz or 1 MHz. The voltage varies little as a function of thickness, but it must be increased (by about twice) when the anchoring is strong.

Experiments were continued to cause a brown fringe to appear, i.e. using maximum contrast. The results of these measurements are shown diagrammatically in dot-dashed lines in FIG. 18. It can be seen that to cause a brown fringe to appear, the voltage must be increased progressively with increasing frequency, for given thickness.

Figure 1:
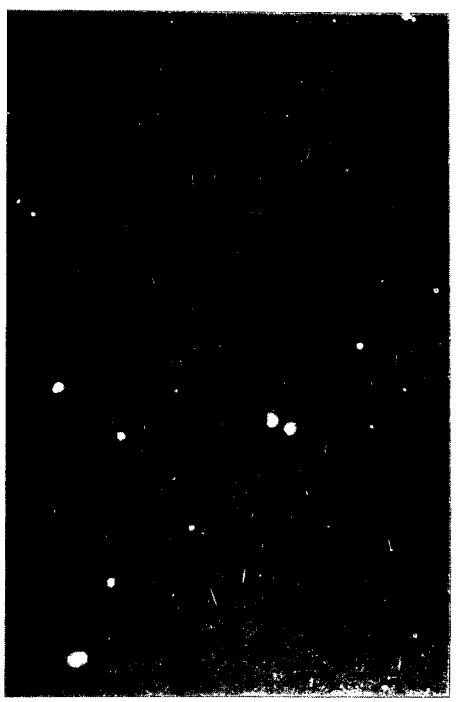

FIG. 1 is a photograph of said liquid crystal electo-optical cell without any excitation voltage.

FIG. 2 is a photograph of the same cell at an excitation voltage corresponding to the illumination threshold at the edges of the various holes 16.

Figure 3:
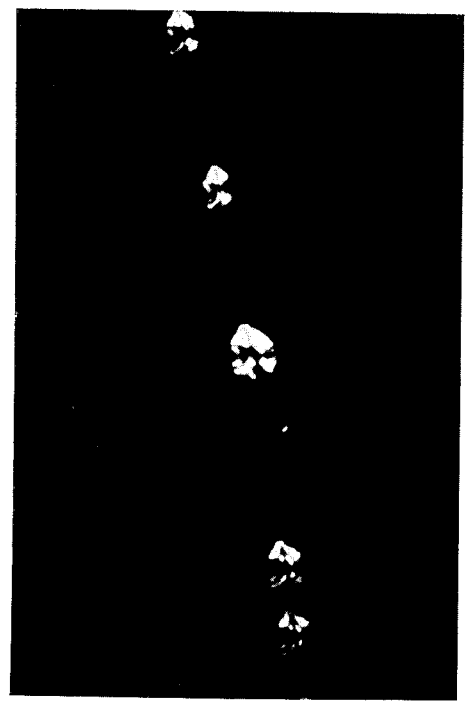

Finally, FIG. 3 is a photograph of the same cell after the brown fringe has appeared.

EXAMPLE 2

In this second series of experiments, glass plates 11 and 12 were used that were covered with conductive layers of indium and tin oxide (ITO) having a thickness of about 250 Å.

The experimental cell was prepared as follows:

After degreasing using acetone and washing in distilled water, one of the plates 12 was dried and modified as follows.

A drop of an aqueous solution of 30% caustic potash was deposited on the plate. Then a blade of aluminum having a thickness of 0.01 mm and a width of about 2 mm was placed in contact with the conductive ITO layer. After about 2 min. of reaction, the plate was washed using distilled water. The ITO was thus reduced by the more electropositive aluminum. The electrical resistance of the ITO coating covering the plate was then measured between a series of pairs of points.

The results of these measurements are shown diagrammatically in FIG. 19.

In this figure, the contact zone between the aluminum blade and the ITO conductive coating is shown diagrammatically at 20. The pairs of points for measuring electrical resistance are referenced diagrammatically $A_1$, $A_2$; $B_1$, $B_2$; $C_1$, $C_2$; $D_1$, $D_2$; and $F_1$, $F_2$ respectively. The values of the resistance measured between these pairs of points are marked on FIG. 19. It can be seen that the electrical resistance increases smoothly until it becomes nearly infinite in the above-specified contact zone between the conductive coating of ITO and the aluminum blade. In other words, an electrical resistance gradient is thus obtained on the coating of ITO.

After drying, and after a junction wire 22 for electrical excitation has been fixed by means of silver varnish 21, the electro-optical cell is made as follows. The plate 12 having the above-mentioned electrical resistance gradient obtained by chemically reducing the ITO coating and the intact conductive plate 11 are separated by a 6$\mu$ thick mylar shim. A 5CB type liquid crystal is inserted by capillarity into the sealed volume defined between the plates 11 and 12 and the shim 13. After applying a potential difference of a few volts, the sample becomes homotropic. It is observed between crossed polarizers.

After applying an excitation voltage at a variable frequency in the range 1 Hz to 7 MHz, it is observed that a luminous halo appears. More precisely, two narrow strips separated by 0.15 mm to 0.20 mm are observed depending on the excitation frequency, which strips are interconnected by two semi-circular strips, in other words the halo has substantially the same shape as the outline of the aluminum blade used for chemical reduction of the conductive ITO coating.

Two types of measurement made on this cell are detailed in the following table. The first or left-hand column of the table gives the excitation frequency corresponding to the various measurements.

The second column gives the voltage at which the corresponding excitation potential reaches the instability threshold, i.e. at which the luminous halo appears.

The third column gives the gap between the rectilinear instability strips as a function of excitation frequency and in arbitrary units.

Finally, the fourth or right-hand column of table 1 specifies the numbers of the corresponding photographs of FIGS. 4 to 15.

TABLE 1

Figure 4:
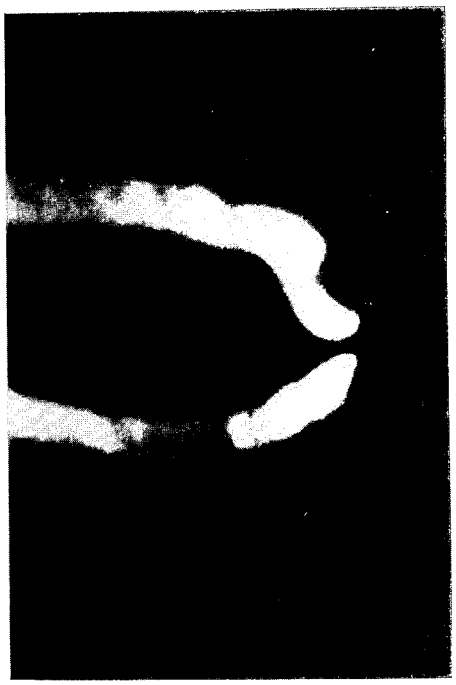
FIGS. 4 to 15 are magnified photographs of a second example of a cell implementing the present invention and corresponding to different electrical excitation frequencies at the same excitation amplitude.
Figure 5:
Figure 6:
Figure 7:
Figure 8:
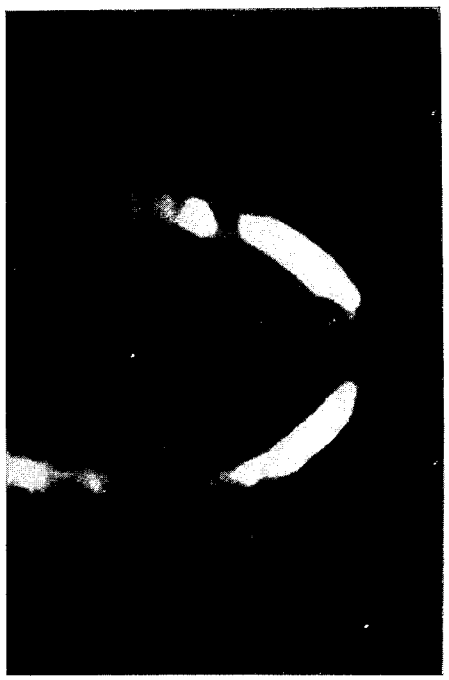
Figure 10:
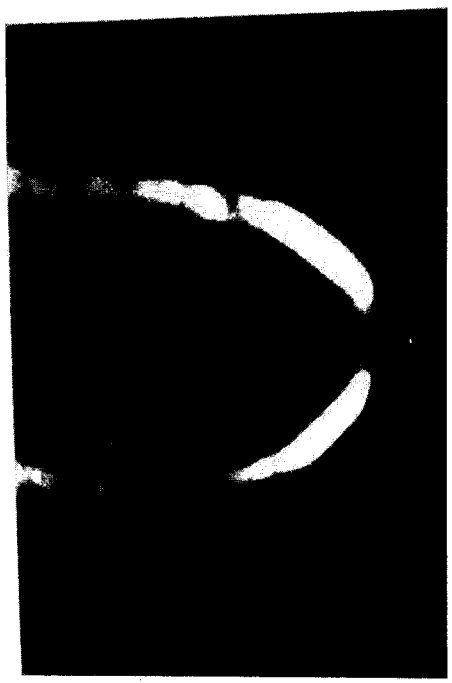
Figure 9:
Figure 11:
Figure 13:
Figure 15:
Figure 12:
Figure 14:

| Frequency | Threshold voltage | Gap in arbitrary units | Photo No. |
|---|---|---|---|
| 10 Hz | 0.8 | | |
| 100 Hz | 0.8 | | |
| 300 Hz | 0.8 | | |
| 1 kHz | 0.8 | | |
| 10 kHz | 0.8 | 40 | FIG. 4 |
| 50 kHz | 0.8 | 42 | FIG. 5 |
| 100 kHz | 0.8 | 45 | FIG. 6 |
| 200 kHz | 0.9 | 47 | FIG. 7 |
| 500 kHz | 1.0 | 49 | FIG. 8 |
| 800 kHz | | 51 | FIG. 9 |
| 1 MHz | 1.4 | 53 | FIG. 10 |
| 2 MHz | | 55 | FIG. 11 |
| 3 MHz | 3.0 | 59 | FIG. 12 |
| 4 MHz | | 62 | FIG. 13 |
| 5 MHz | 3.9 | 64 | FIG. 14 |
| 6 MHz | | 65 | FIG. 15 |

It can be seen from the above table and from FIGS. 4 to 15, that the gap between the rectilinear instability strips increases as a function of the excitation frequency. This result is explained below.

Reference is now made to FIG. 17 in order to explain the phenomenon implemented by the present invention.

FIG. 17 shows a cell 10 similar to that shown in FIG. 16 and comprising two transparent plates 11 and 12 which are parallel and coated with electrodes 14 and 15. The plates 11 and 12 are separated by a shim 13. The cell contains a liquid crystal 17. One of the electrodes 15 has a zone 17 of varying resistance. For the purpose of simplifying the following explanations, this resistance is assumed to increase smoothly from the periphery of the zone 16 towards the center thereof.

Now let us consider two points G and H on the electrode 15. A first point G is situated substantially at the center of the zone 16 of controlled variation in the resistance of the coating. The second point H is situated on the same coating, but outside the zone 16, for example on the periphery thereof. Finally, a third point J is considered located on the other coating 14 and situated on a normal to the coatings 14 and 15 passing through the first point G.

The impedance between the first and second points H and G is essentially resistive and is illustrated diagrammatically by a resistor referenced R in FIG. 17.

The impedance between the first and third points G and J is essentially capacitive and is illustrated diagrammatically by a capacitor referenced $C_O$ in FIG. 17.

Finally, the impedance between the second and third points H and J is essentially capacitive and is illustrated diagrammatically by a capacitor referenced $C_i$ in FIG. 17.

It is known that the capacitances $C_O$ and $C_i$ between the third point J and the first and second points G and H respectively are inversely proportional to the distance between each pair of points. Consequently, the dielectric impedance $(1/C_i)$ between the third point J and the second point H is always greater than the dielectric impedance $(1/C_O)$ between the third point J and the first point G. Further, the impedances reduce with increasing excitation frequency.

For a relatively low excitation frequency, the sum of the dielectric impedance between the third and first points G and J, and the impedance of the coating of R between the second and the first points H and G is less than the dielectric impedance between the third and second points J and H.

Charge is therefore distributed substantially uniformly over the electrode 15 in spite of the presence of the zone 16 of varying impedance.

With increasing excitation frequency, the dielectric impedances between the third point and the first and second points G and H respectively decrease.

At a frequency referred to in the present patent application as the "critical instability frequency", the sum of the dielectric impedance between the third and first points J and G, and the coating impedance between the first and second points G and H, becomes equal to the dielectric impedance between the second and third points J and H. As a result, non-uniform charge distribution is obtained on the coating 15 with the higher impedance zone 16 of said coating being starved of charge.

As a result, the electric field lines in the vicinity of the plate 12 having the zone 16 of varying impedance and close to the points H where said impedance is equal tend to slope inwardly towards the center of the zone 16. More precisely, across the thickness of the cell, the electric field lines are curved towards the center of the zone 16 in the proximity of the plate 12 so that they arrive substantially perpendicularly at the opposite plate 11.

With further increase in the excitation frequency, and given the corresponding reduction in the capacitive dielectric impedances between the third point J and the first and second points G and H, the above instability phenomenon is obtained at even lower impedance values between the first and second points G and H, i.e. for locations of the second point H which are even further from the center of the zone 16 having an electrical resistance gradient (i.e. for locations of the second point H corresponding to a smaller variation in impedance).

In other words, the intrinsic capacitance C of the cell and the controlled surface resistance R of the electrode define a relaxation time constant RC enabling a critical instability frequency to be defined in terms of an angular frequency $w_c$ such that $w_c RC = 1$, where R is taken to represent the resistance per square in the zones of varying impedance, and C represents the capacitance of a cell element between the plates 11 and 12 constituted by a cube whose sides are equal to the distance between the two plates 11 and 12.

When the angular frequency w of the excitation signal generated by the means 30 is greater than the critical instability frequency $w_c$, the field slopes over the zones 16 of varying impedance. When the angular frequency w is less than the critical instability frequency $w_c$, the field is normal to the plates.

This phenomenon is clearly shown in FIGS. 4 to 15 which show that the gap between the rectilinear instability zones (corresponding to the locations of the second point H) increases with excitation frequency when the zones 16 of varying impedance have an impedance gradient.

Consequently, the method of using a liquid crystal electro-optical device in accordance with the present invention essentially includes a stage in which an electrical excitation alternating voltage is applied between the two electrodes provided on respective ones of the plates 11 and 12 at a frequency which is greater than the critical instability frequency at which the essentially capacitive dielectric impedance ($1/C_i$) between the second and third points H and J is equal to the sum of the dielectric impedance ($1/C_O$) between the third and first points G and J and the impedance between the first and second points G and H where the first point G is on a zone of controlled impedance variation in the coating 15, the second point H is on the same coating but outside said zone, and the third point J is located on the other coating and is situated on a normal to the coating passing through the first point G.

According to another advantageous feature of the invention, in order to eliminate the birefringence effect obtained when applying an electrical excitation voltage at a frequency greater than the above-mentioned critical instability frequency, the method of utilization advantageously includes a stage consisting in applying an electrical inhibiting voltage between the electrodes at a frequency which is less than the critical frequency.

When applying such an inhibiting electric voltage at a frequency less than the critical frequency, the electric field lines return to being perfectly perpendicular to the plates 11 and 12 in order to define a uniform alignment of the liquid crystal molecules by virtue of the coupling between the electric field and the dielectric anisotropy of the molecules.

The application of an inhibiting electric voltage at a frequency less than the critical instability frequency naturally makes it possible to switch off the birefringence effect very rapidly and in any event more rapidly than could be achieved if the excitation voltage were simply to be switched off, in which case the birefringence effect would die away as a function of a relaxation time related to the bending elasticity of the molecules.

Naturally, when the selected zones of the electrode are of infinite impedance, as can be obtained by completely removing the electrode coating, the critical excitation frequency is zero. All that then needs to be done is to apply a direct electric voltage between the electrodes in order to obtain an electric field which is sloping relative to a normal to the electrode. Under such circumstances (i.e. when the selected zones have infinite impedance) with a critical frequency of zero, it is not possible to apply an inhibiting electric voltage at a lower frequency. In order to switch off the birefringence effect, it then becomes necessary to switch off the excitation alternating voltage.

In order to display alphanumeric characters by means of a liquid crystal electro-optical cell in accordance with the present invention, a series of zones having varying surface impedance should be formed on one of the electrodes 15 of the cell for reproducing the alphanumeric characters to be displayed, for example for displaying matrices of points or lines in each of areas 19 of an electrode, as shown diagrammatically in FIG. 20.

Since the sloping effect appears over a width equal to the width of the cell, this matrix of points or lines will have a lateral pitch comparable to said cell thickness. It can thus be seen that FIG. 20 is not to scale, since, in practice, the thickness of the cell between the electrodes 14 and 15 is of the same order as the pitch between the points or the lines marked on the areas 19, as explained above.

When an excitation voltage is applied to the terminals of the cells at a frequency greater than the critical instability frequency and at an amplitude greater than the threshold amplitude, the cell displays an alphanumeric character defined by the controlled impedance variation areas 19 which are excited.

In order to switch off the displayed character, the same excited areas should have an excitation voltage applied thereto at a frequency which is less than the critical instability frequency, or else the excitation voltage should be switched off.

In order to display different alphanumeric characters using the same electro-optical device, the electrode 15 should be divided into a plurality of separate areas 19 and the excitation voltage should be applied to said areas selectively.

Only those zones 16 which are located between electrode areas 19 actually receiving an excitation voltage at a frequency greater than the critical instability frequency and at an amplitude greater than the threshold amplitude are illuminated.

The various zones of areas to be excited of the electrode 15 may have different critical frequencies, thereby enabling selective display to be performed by controlling the excitation frequency.

FIG. 21 is a diagram showing an example of excitation signals applied to respective electrodes of a cell in accordance with the invention in an advantageous manner and respectively constituting line electrodes and column electrodes.

FIG. 21 shows that the excitation voltage applied to a zone 16 of controlled impedance variation may be formed by superposing two low frequency signals applied to respective ones of the electrodes and phase shifted in such a manner as to give rise to high frequency components.

The signals shown in FIG. 21 are given purely by way of non-limiting example.

Naturally, the present invention is not limited to the examples which are described above, but extends to any modification thereof lying within the scope of the claims.

It is mentioned above that the birefringence effect is visible at an excitation frequency greater than the critical instability frequency, and that it ceases to be visible for an excitation frequency which is less than the critical instability frequency. This corresponds to using crossed polarizers facing the plates 11 and 12. An inverse disposition may be obtained by using un-crossed polarizers or by using liquid crystals having negative dielectric anisotropy.

We claim:

1. A method applicable to a liquid crystal cell comprising two parallel transparent plates coated on their facing inner faces with electrode-forming conductive coatings, and with a shim interposed between the plates, the space in said cells between said plates containing a substance including molecules which are endowed with nematic properties, wherein:

controlled variations in surface impedance are defined on at least one of the electrode coatings in selected zones thereof; and a variable frequency excitation electrical voltage is applied between the electrodes provided on respective ones of said plates, said frequency being selected to be suitable for producing alternately an electric field extending normally to the electrodes and an electric field which slopes relative to the normal to said electrodes at said zones having a controlled impedance variation.

2. A method according to claim 1, wherein the controlled surface impedance variations of at least one of the electrode coatings is obtained by altering the intrinsic impedance of the electrode-forming conductive coating.

3. A method according to claim 1, wherein the stage consisting in defining controlled variations in surface impedance in at least one of the electrode coatings is performed as follows:
   a uniform layer of homogeneous conductive coating is deposited on one of the plates, and then;
   the surface impedance of the coating is modified in selected zones thereof by a chemical reaction.

4. A method according to claim 3, wherein the stage consisting in defining the controlled variations in surface impedance of at least one of the electrode coatings is performed as follows:
   a uniform layer of a conductive electric coating of indium and tin oxide is deposited on one of the plates, and then;
   the indium and tin oxide is at least partially chemically reduced in the selected zones of the coating by chemical reaction.

5. A method according to claim 1, wherein the stage consisting in defining the controlled variations in surface impedance of at least one of the electrode coatings is performed as follows:
   a uniform layer of homogeneous conductive coating is deposited on one of the plates, and then;
   the selected areas of the coating are mechanically reduced in thickness.

6. A method according to claim 1, wherein the controlled variations in surface impedance of at least one of the electrode coatings are provided by depositing a covering layer on the selected zones of the electrically conductive coating, said covering layer being made of a material having different electrical conductivity from the coating.

7. A method according to claim 1, wherein the controlled variations in surface impedance of at least one of the electrode coatings correspond to a smooth variation in impedance from the peripheries of the selected zones towards the centers thereof.

8. A method according to claim 1, wherein the controlled variations in surface impedance of at least one of the electrode coatings correspond to a step variation in the impedance on crossing the boundaries of the selected zones.

9. A method according to claim 1, including a stage consisting in applying an alternating electrical excitation voltage between the two electrodes provided on respective ones of the plates at a frequency which alternates between being greater than and less than a critical instability frequency at which the essentially capacitive dielectric impedance ($1/C_i$) between a second point and a third point is equal to the sum of the dielectric impedance ($1/C_O$) between the third point and a first point and the impedance (R) between the second point and the first point, where said first point is located on a zone of controlled impedance variation of a coating, said second point is located on the same coating but outside said zone, and said third point is located on the other coating and is situated on a normal to both coatings and passing through said first point.

10. A method according to claim 1, wherein the excitation voltage applied to the zones of controlled impedance variation is obtained by superposing two low frequency signals applied to respective ones of said electrodes and shifted in phase relative to each other in such a manner as to give rise to high frequency components.

11. A method according to claim 1, wherein the various zones or areas to be excited on an electrode with controlled impedance variations have different critical frequencies, thereby enabling selective display to be obtained by controlling the excitation frequency.

12. A method according to claim 1, including a stage consisting in applying an alternating excitation electric voltage between the two electrodes at a frequency which alternates between being greater than and less than a critical instability frequency whose angular frequency $w_c$ is defined by the equation:

$$w_c RC = 1$$

where R designates the resistance per square in the zones of controlled impedance variation and C designates the capacitance of a cell element constituted by nematic molecules occupying a cube whose sides are equal to the distance between the two transparent plates.

13. A liquid crystal electro-optical device for implementing the method according to claim 1, said device comprising two parallel transparent plates each coated on one of its faces with an electrode-forming conductive coating, a shim disposed between the plates, a substance including molecules endowed with nematic properties occupying the space between the two electrodes and the shim, wherein at least one of the conductive coatings has controlled surface impedance variations in selected zones, the device further including means suitable for applying an electric excitation voltage between respective electrodes on said plates at a variable frequency selected so as to alternate between producing an electric field which extends normally to the electrodes and an electric field which extends at a slope relative to the normal to the electrodes over said zones having controlled variations in impedance.

14. An electro-optical device according to claim 13 wherein the molecules endowed with nematic properties have strong positive dielectric anisotropy.

15. An electro-optical device according to claim 14, wherein the molecules endowed with nematic properties belong to substances in the cyanobiphenyl family.

16. An electro-optical device according to claim 13 wherein the molecules endowed with nematic properties have strong negative dielectric anisotropy.

17. An electro-optical device according to claim 13, wherein the zones having controlled variations in impedance are distributed over isolated areas of the electrode-forming coating.

* * * * *